United States Patent
Bjerge et al.

(10) Patent No.: US 8,167,556 B2
(45) Date of Patent: May 1, 2012

(54) METHOD AND APPARATUS FOR DAMPING TOWER OSCILLATION IN A WIND TURBINE

(75) Inventors: Martin Bjerge, Herning (DK); Per Egedal, Herning (DK)

(73) Assignee: Siemens Aktiengesellschaft, Munich (DE)

( * ) Notice: Subject to any disclaimer, the term of this patent is extended or adjusted under 35 U.S.C. 154(b) by 450 days.

(21) Appl. No.: 12/465,709

(22) Filed: May 14, 2009

(65) Prior Publication Data
US 2009/0292397 A1 Nov. 26, 2009

(30) Foreign Application Priority Data
May 21, 2008 (EP) .................................. 08009396

(51) Int. Cl.
F03D 7/02 (2006.01)
(52) U.S. Cl. ........................................ 416/35; 416/500
(58) Field of Classification Search .................... 416/30, 416/35, 132 B, 500; 290/44
See application file for complete search history.

(56) References Cited

U.S. PATENT DOCUMENTS

| | | | |
|---|---|---|---|
| 4,700,081 A | 10/1987 | Kos et al. | |
| 6,176,675 B1 * | 1/2001 | Engstrom | 415/4.3 |
| 6,672,837 B1 * | 1/2004 | Veldkamp et al. | 416/144 |
| 2003/0151260 A1 | 8/2003 | Siegfriedsen | |
| 2006/0033339 A1 | 2/2006 | Pasuri | |

FOREIGN PATENT DOCUMENTS

| | | |
|---|---|---|
| EP | 1643122 A2 | 4/2006 |
| WO | 2007053031 A1 | 5/2007 |

OTHER PUBLICATIONS

Bossanyi, et al., The Design of Closed Loop Controllers for Wind Turbines, Wind Energy, 2000, pp. 149-163, vol. 3, No. 3, XP007908706.

* cited by examiner

*Primary Examiner* — Chandra Chaudhari

(57) ABSTRACT

A method of damping tower oscillation in a wind turbine is provided. The method includes the steps of determining a rotor rotational speed of the wind turbine and controlling the rotor rotational speed such that a critical rotor speed is avoided, characterized in that it further comprises the following steps: selecting at least one input parameter value; selecting, according to the input parameter value, an operation mode for controlling the rotor rotational speed, wherein the operation mode is selected from a set of modes comprising a mode of auto tune operation; on the condition of the selected operation mode comprising the mode of auto tune operation, performing the following steps: detecting the tower oscillation frequency; calculating the critical rotor speed based on the detected tower oscillation frequency and controlling the rotor rotational speed to avoid the calculated critical rotor speed. An apparatus and a computer program product are also provided.

11 Claims, 2 Drawing Sheets

METHOD AND APPARATUS FOR DAMPING TOWER OSCILLATION IN A WIND TURBINE

CROSS REFERENCE TO RELATED APPLICATIONS

This application claims priority of European Patent Office application No. 08009396.6 EP filed May 21, 2008, which is incorporated by reference herein in its entirety.

FIELD OF INVENTION

This invention relates to a method of damping tower oscillation in a wind turbine, comprising the steps of determining a rotor rotational speed of the wind turbine and controlling the rotor rotational speed such that a critical rotor speed is avoided, and an apparatus and a computer program product therefor.

BACKGROUND OF INVENTION

In wind turbine systems known in the art, sudden changes in the velocity of the wind acting on the rotor of the wind turbine cause the tower of the wind turbine to sway. Such oscillation of the wind turbine tower is known to significantly shorten the technical life span of the tower, and also to produce significant mechanical load in the yaw system and gearing.

Such oscillations can be still dramatically increased in cases of variable speed turbines, in which certain rotational speeds can cause oscillations that match the tower resonant frequency.

In order to avoid this adverse effect, systems of the art have been built strong enough to tolerate these extra forces, particularly regarding the tower construction. However, such an approach leads to significant technical overdimensioning and thus extra technical effort, and may also cause logistic problems as to transporting the wind turbine components, since such components may become too large or heavy to economically deliver them to the wind turbine site.

In order to reduce such extra effort, it is known in the art to control the rotational speed of the wind turbine such that the actual rotor speed is kept away from a critical speed, that is, a speed that would produce excessive vibration due to resonance with the tower resonant frequency. However, such systems need to be manually configured, in order to properly specify the critical speed to be avoided. Such manual configuration complicates the process of adding wind turbines to the grid.

U.S. Pat. No. 4,700,081 shows a method and apparatus that performs a speed control of a wind turbine such that a critical speed is avoided. This system increases the rotational speed at a specified rate except in the vicinity of the critical speed. When approaching the critical speed, the rate of increase is reduced to avoid reaching the critical speed. In further scenarios, the change rate is adapted such that the critical speed is quickly passed through to not induce resonant vibrations.

SUMMARY OF INVENTION

The objective of the present invention thus is to provide a method for controlling the rotor rotational speed of a wind turbine such that excessive vibrations in the wind turbine tower are avoided while reducing technical configuration and maintenance efforts.

This object is achieved by the subject-matter of each of the independent claims.

A method of damping tower oscillation in a wind turbine is provided. The method comprising the steps of determining a rotor rotational speed of the wind turbine and controlling the rotor rotational speed such that a critical rotor speed is avoided, characterized in that it further comprises the following steps:

Selecting at least one input parameter value;
Selecting, according to the input parameter value, an operation mode for controlling the rotor rotational speed, wherein the operation mode is selected from a set of modes comprising a mode of auto tune operation;
On the condition of the selected operation mode comprising the mode of auto tune operation, performing the following steps:
a. Detecting the tower oscillation frequency;
b. Calculating the critical rotor speed based on the detected tower oscillation frequency and controlling the rotor rotational speed to avoid the calculated critical rotor speed.

By providing different modes of operation, of which one is an auto tune mode in which the tower oscillation frequency is automatically detected, the effort of configuration is significantly reduced. Upon startup of a wind turbine tower that is going to be connected to the grid, the method allows to dynamically adapt itself and thus allows a wind turbine to be used in a variety of scenarios without additional adaptation or configuration of the control logic.

By selecting a mode of operation from a variety of modes, it is enabled to provide modes that reflect such different scenarios of use. Thus, not only can the present control method be used with a larger variety of wind turbine systems, it also can be used over the entire life span of the wind turbine, even when use conditions change.

By automatically detecting the tower oscillation frequency, the step of manually setting a precise value for the critical speed is avoided. Thus, individual calculation steps and the steps of entering that value into the control system are avoided. The tower oscillation frequency is determined by the tower resonant frequency.

By providing input values upon which the mode of operation can be selected, it is possible to provide all relevant input information that enable alternative modes of operation, or a combination thereof. It further is enabled to provide input information to determine the mode of operation that is to be selected by the method.

The invention can be embodied as specified in the dependent claims.

In embodiments, the input parameter value comprises an avoid range input parameter, and selecting the operation mode comprises evaluating the avoid range input parameter.

This allows to select the mode of auto tune operation on the condition of the avoid range input parameter not being a Null value. In all embodiments, a Null value can be any value particularly defined for indicating that no value is defined, such as the number zero, or a NULL symbol.

In embodiments of the invention, the input parameter value comprises an avoid frequency input parameter, and selecting the operation mode comprises evaluating the avoid frequency input parameter.

As to mode selection, the mode of auto tune operation can then be selected on the condition of the avoid frequency input parameter being a Null value. In particular, the auto tune operation can be selected in the specific case of the avoid range input parameter not being a Null value and the avoid frequency input parameter being a Null value.

For ensuring highly reliable operation, the invention can be embodied based on that selecting the mode of auto tune operation comprises verifying that the detected tower oscillation frequency matches a stored reference frequency.

The invention can further be embodied such that the set of modes comprises a mode of static frequency operation. Such mode of static frequency operation can be selected on the condition of the avoid frequency input parameter not being a Null value.

Such embodiments of the invention can comprise determining if the condition of the selected operation mode comprises the mode of static frequency operation, and controlling the rotor rotational speed to avoid the critical rotor speed corresponding to the avoid frequency input parameter on the condition that the selected operation mode comprises the mode of static frequency operation.

In embodiments of the invention, the set of modes comprises a mode of being disabled. Such a mode can be selected on the condition of the avoid range input parameter being a Null value or a value smaller than a Null value.

In order to provide reliable results for all practical situations in which resonance-based, excessive vibrations are likely to occur, and, at the same time, avoid large computational loads, embodiments of the invention can be characterized in that the critical rotor speed is calculated based on the triple of the detected tower oscillation frequency on the condition of the detected tower oscillation frequency being larger than and/or equal to a rotor speed corresponding to the maximum number or revolutions per minute of the generator of the wind turbine. Thus, both 1P and 3P-oscillations (in terms of oscillation of the rotor wings running by the tower: 1P refers to one period per rotor period, 3P refers to three periods per rotor period) are being handled by the system without having to consider a class of currently irrelevant critical rotor speeds.

The method can further be embodied so that controlling the rotor rotational speed comprises the following steps:

Increasing a power reference by an additional amount to exceed an optimum power curve of the wind turbine when the rotor speed is below the critical rotor speed and within an outer range encompassing a range specified by the avoid range input parameter, so that reaching the critical rotor speed is avoided or at least delayed;

Decreasing the power reference when the rotor speed is within the range specified by the avoid range input parameter, so that the rotor speed quickly passes through the critical rotor speed;

Increasing the power reference up to an optimum power reference of the optimum power curve when the rotor speed exceeds the range specified by the avoid range input parameter. This can be implemented such that the optimum power reference is reached at the latest when the rotor rotational speed exceeds the outer range.

These steps can be performed on the condition of the rotor rotational speed is increasing from below the critical rotor speed to above the critical rotor speed. A step of detecting this condition can be implemented.

Accordingly, the method can be implemented to perform the following steps on the condition of the rotor rotational speed is decreasing from above the critical rotor speed to below the critical rotor speed:

Decreasing a power reference by an additional amount to go below an optimum power curve of the wind turbine when the rotor speed is above the critical rotor speed and within an outer range encompassing a range specified by the avoid range input parameter, so that reaching the critical rotor speed is avoided or at least delayed;

Increasing the power reference when the rotor speed is within the range specified by the avoid range input parameter, so that the rotor speed quickly passes through the critical rotor speed;

Decreasing the power reference down to an optimum power reference of the optimum power curve when the rotor speed goes below the range specified by the avoid range input parameter. This can be implemented such that the optimum power reference is reached at the latest when the rotor rotational speed goes below the outer range.

In embodiments, the avoid range input parameter may be given as a speed radius ($n_{Window}$) on both sides of the critical rotor speed ($n_{Critical}$).

A wind turbine control apparatus for carrying out the method of the invention is provided. The apparatus comprising a speed detector configured to determine a rotational speed of a rotor of a wind turbine, a processing unit configured to control the rotor rotational speed such that a critical rotor speed is avoided, and a memory, characterized in that it further comprises an acceleration sensor to determine a tower oscillation frequency of a tower of the wind turbine;

the memory comprises at least one input parameter value;

the processing unit is configured to select, according to the input parameter value, an operation mode for controlling the rotor rotational speed, wherein the operation mode is selected from a set of modes comprising a mode of auto tune operation;

the processing unit is configured to execute, on the condition of the selected operation mode comprising the mode of auto tune operation, following steps:

a. Detecting the tower oscillation frequency;

b. Calculating the critical rotor speed based on the detected tower oscillation frequency and controlling the rotor rotational speed to avoid the calculated critical rotor speed.

Thus, an appropriate control apparatus is provided that implements the method as given above, or any of its embodiments. Consequently, the apparatus can be embodied corresponding to the dependent claims referring. In particular the apparatus can be embodied by its processing unit being configured to perform one or more particular of the method features or one of its embodiments.

A computer program product stored on a computer-readable medium is provided. The product comprising computer-readable instructions for carrying out the method and/or configuring the apparatus on a computer. The computer program product serves to carry out the method when the program product is run on a computer.

The computer program product may accordingly be stored on a magnetical or optical storage medium, like a CD-ROM or DVD-ROM, Floppy Disk or Hard Disk, as well as in a semiconductor component, like a memory component or a memory element in a processor.

BRIEF DESCRIPTION OF THE DRAWINGS

The invention may further be embodied as explained in more detail below, referring to the following figures.

DETAILED DESCRIPTION OF INVENTION

Figure 1:
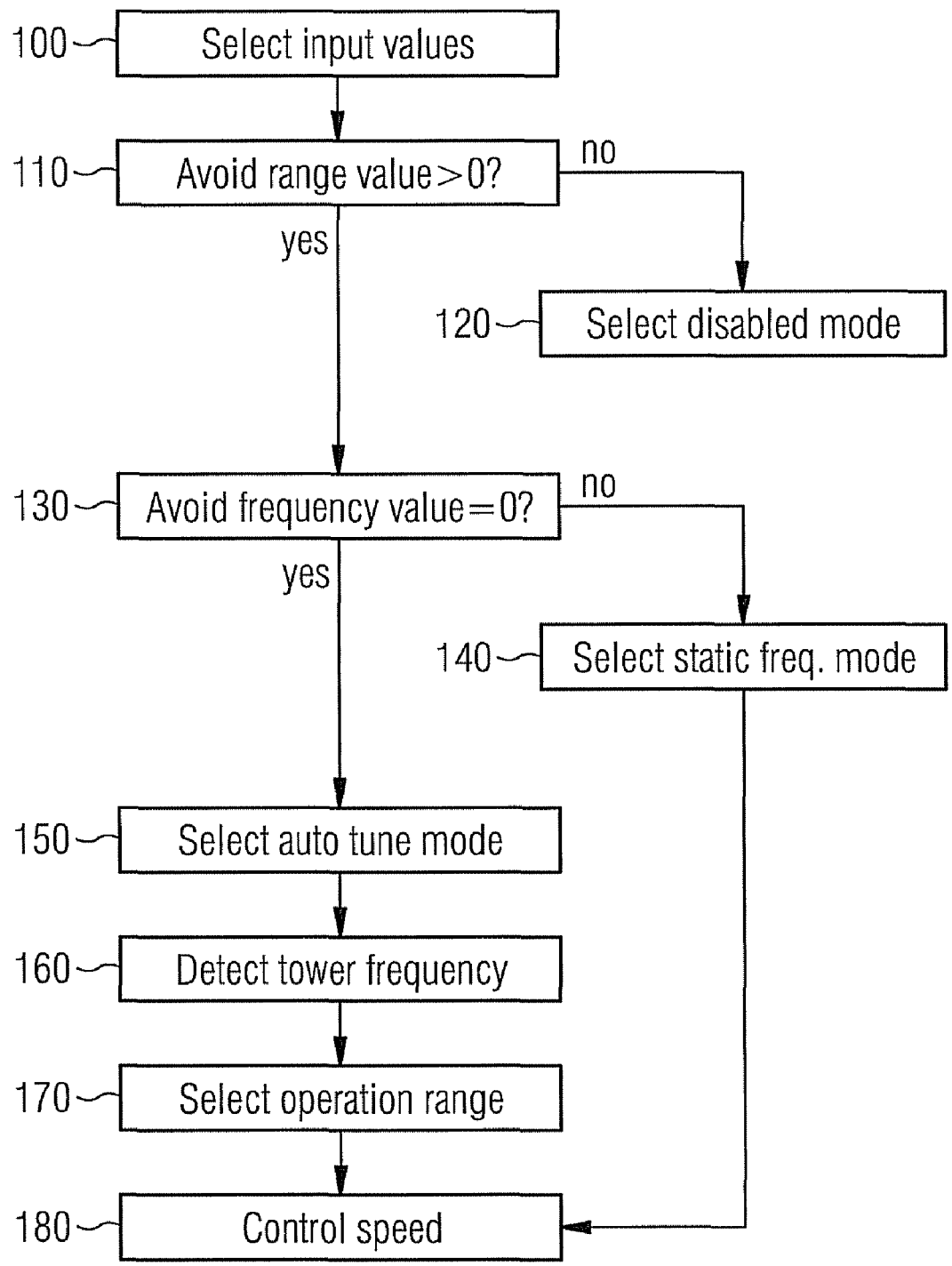
FIG. 1 shows a schematic overview of an embodiment of the method of present invention.

FIG. 1 shows schematic overview of an embodiment of the method of present invention. In step 100, the processing unit (of the apparatus that will be further described with reference to FIG. 2) selects input values from an input value repository. Among these input values are, in the present embodiment, an avoid range value and an avoid frequency value. Based upon both of these input parameters, the controlling method will automatically select the corresponding mode of operation.

In step 110, the processing unit evaluates the avoid range input parameter and determines if its value is positive. By having a positive avoid range value, a range of rotor speed is defined within which the actual current rotor speed is controlled such that it quickly passes a critical speed that is located within the range. The range is defined by defining a distance between any critical speed value and the range boundaries, so that the absolute values of the lower and upper boundary of the range can be determined as soon as a manually specified or automatically detected critical speed value is defined.

If the specified avoid range value is null, or a Null element, the processing unit selects the mode of operation of being disabled in step 120 and discontinues operation and/or generates an appropriate message for notifying the wind turbine operator. In the disabled mode, towerdamping does not take place while the wind turbine may still continue to operate. However, embodiments may be implemented to halt the wind turbine automatically, or manually by an operator, upon entering the disabled mode. Thus, damages to the wind turbine can be prevented.

If the specified avoid range value is not null, or not a Null element, the processing unit continues selecting the appropriate mode of operation by evaluating the avoid frequency input parameter in step 130 and determines if its value is null, or a Null element. Using the avoid frequency value, a critical value can be manually defined, or defined by an external calculation system, such as a central wind turbine operating office. This critical frequency value is then used for subsequent control. Accordingly, the processing unit selects the static frequency operation mode in step 140 and, after having converted the critical frequency value to a critical rotor speed value, immediately starts with its speed control operation in step 180, which will be described further below.

If the specified avoid range is null, or a Null element, or not available, the processing unit selects the auto tune operation mode in step 150. When selecting the auto tune operation mode, the processing unit may perform a system check to ensure if proper acceleration sensors are present and properly operating, and generate an error message and change into the disabled mode otherwise.

In step 160, the processing unit detects the tower frequency, or tower resonant frequency, by measuring a set of acceleration signals and performing a frequency analysis of these signals, thus obtaining the tower frequency.

After having thus detected the tower frequency, the processing unit may store the detected tower frequency in a memory as a reference value. In this case, the processing unit may also check if a previous reference value is present, and further verify if the presently detected tower frequency value matches the reference value having been generated before. In case of a mismatch, the processing unit can generate an error message and change into the disabled mode. By thus making sure that the tower frequency is properly detected, it is ensured that no incorrect frequency value is used, which might be produced after a change of the acceleration sensor or turbine controller.

Such steps of validating and reference value storing may also be implemented in an acceleration measurement module, which may send an OK status signal if the signal is reliable, and which stores the detected frequency in its flash memory while the OK status is valid. Upon occurrence of the OK status, a copy of the frequency value may also be saved to in the turbine controller memory. In this case, upon restarting of the turbine controller, it is sufficient to compare the saved frequency values for the verification, so that the turbine does not have to wait for the full detection process in order to operate while still ensuring that no incorrect frequency value is used.

In step 170 the processing unit selects an operation range. Since resonance problems typically arise in cases of 1P- and 3P-oscillation, the processing unit determines if the detected tower frequency might match frequencies in either the 1P-range or 3P-range of possible frequencies. These ranges may be practically determined, with the help of known wind turbine system parameters, such as the least possible number of revolutions per minute of the generator, and the highest possible number of revolutions per minute (Rpm) of the generator.

For instance, the 1P problem range could be defined as ranging from LB(1P)=Minimum Rpm of Generator/60/Gear ratio to UB(1P)=Maximum Rpm of Generator/60/Gear ratio.

Likewise, the 3P problem range could be defined as ranging from LB(3P)=Minimum Rpm of Generator/60/Gear ratio*3 to UB(3P)=Maximum Rpm of Generator/60/Gear ratio*3.

In the present embodiment, the detected tower frequency is thus compared to UB(1P) as defined above, and, if the detected tower frequency is below UB(1P), the processing unit calculates the critical rotor speed based on the detected tower frequency without additional scaling. If, however, the detected tower frequency is equal to or larger than the UB(1P), the processing unit calculates the critical rotor speed based on the detected tower frequency multiplied by three.

In step 180, the actual speed control of the wind turbine rotor is performed. The rotor speed is controlled such that it is kept away from the critical rotor speed, which would induce resonance and thus excessive vibrations in the wind turbine tower. In particular, this can be achieved by appropriately manipulating the power reference which controls the speed of the generator of the wind turbine at low winds.

Upon an increase of the wind speed, the rotor rotational speed increases accordingly. In order to achieve optimum power production, the power reference is increased as a function of the rotor rotational speed, according to a given optimum power curve.

Figure 3:
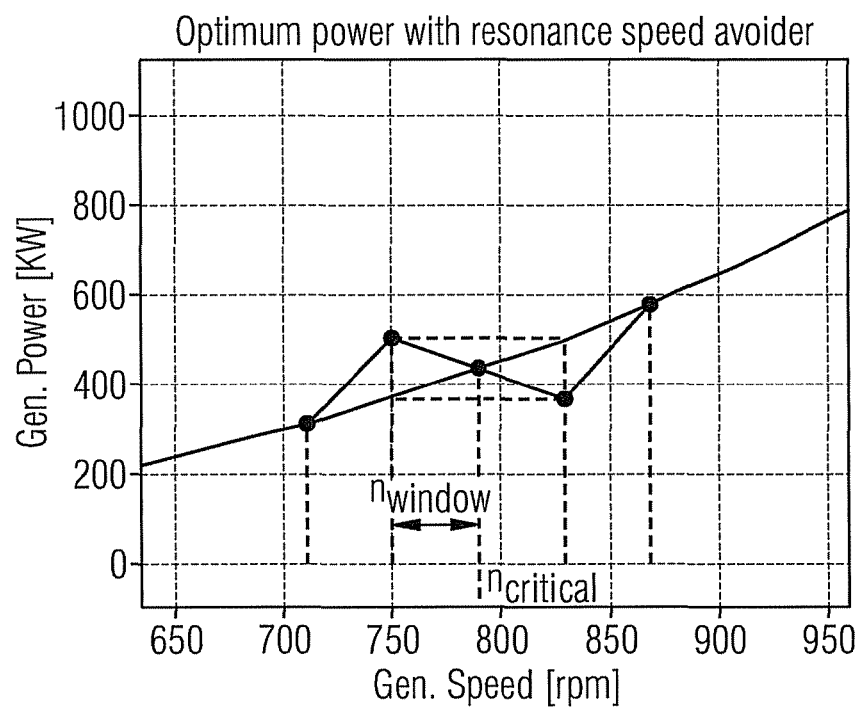
FIG. 3 shows a diagram illustrating the dynamic control behaviour.

In the case that the rotor rotational speed is approaching a specified outer window (for instance, 1.5 times or 2 times the inner window (avoid range parameter), as shown in FIG. 3) around the resonance speed (critical rotor speed) while the speed is increasing from a low speed to a higher speed, the power reference is additionally increased by an extra amount, thus deviating from the optimum power curve (see FIG. 3). In this way, the rotational speed is kept down to avoid the critical rotor speed in advance.

When the rotational speed increases still further, so that it reaches the inner window (that is, the lower boundary of the range specified by the avoid range parameter) around the resonance speed, the power reference is decreased. This evokes a rapid increase of the rotor rotational speed, so that the critical speed is quickly passed through and the rotor speed is past the resonance speed.

Upon the rotational speed leaving the inner window (that is, increasing beyond the upper boundary of the avoid range), the power reference is increased again such that the power reference and the rotor speed both follow the optimum curve again at the point where the rotational speed is leaving the outer window.

In the case that the rotor rotational speed is approaching the specified outer window around the resonance speed while the speed is decreasing from a high speed to a lower speed, the system behaves accordingly, mutatis mutandis: Upon entering the outer window from above, the power reference is decreased by an additional amount to deviate from the optimum curve. When entering the inner window from above, the power reference is increased in order to provide a quick passing-through the critical speed, and upon leaving the inner window (decreasing beyond the lower boundary), the power reference is decreased again such that the power reference and the rotor speed both follow the optimum curve again at the point where the rotational speed is leaving the outer window in the same direction.

This is illustrated in FIG. 3, wherein the critical speed is indicated by $n_{Critical}$ and the radius of the avoid range input parameter (inner window) around said critical speed is indicated by $n_{Window}$.

In embodiments, the disabled mode may also be defined by the avoid frequency being null or smaller than null when other critical criteria for performing the automatic tuning operation are not met.

The process of validating the determined tower frequency that has been described with reference to step 160 may take place when the wind turbine system is newly added to the grid, or reconnected after maintenance. However, the present system can also be implemented to perform this check regularly during wind turbine operation.

Figure 2:
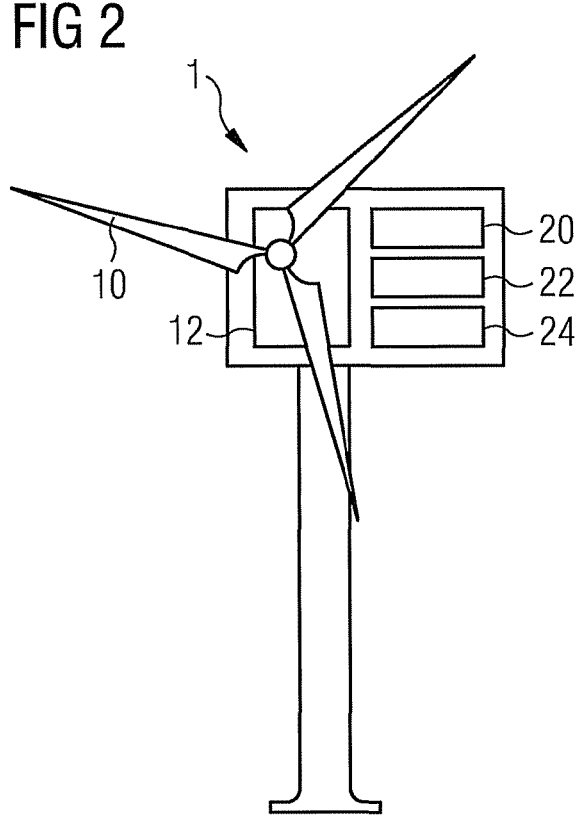
FIG. 2 shows a schematic overview of an apparatus corresponding to the method of FIG. 1.

FIG. 2 shows a schematic overview of an apparatus corresponding to the method of FIG. 1, comprised in a wind turbine.

Wind turbine 1 comprises a rotor 10 and a gearing 12, a processing unit 20, a memory 22 and an acceleration sensor 24. All aforementioned components being located at or in a nacelle, the nacelle is mounted on top of a wind turbine tower 14. Gearing 12 further comprises a speed sensor for determining the speed of rotor 12.

Processing unit 20 is configured to carry out the steps of the method of the embodiment described with reference to FIGS. 1 and 3 above. For this, processing unit 20 is connected to the speed and acceleration sensors, to actuators or other control equipment for setting the rotor speed or power reference value, and to memory 22.

Processing unit 20 can be configured by standard or application-specific hardware and may be programmed with appropriate software elements.

Thus, a wind turbine control system is provided that reliably avoids critical rotor speeds that produce excessive vibration due to resonance. At the same time, the presently proposed system reduces maintenance and configuration effort and is widely applicable to a variety of different wind turbine systems. The turbine controller reinitializes the turbine settings every time it restarts the turbine, for instance after a turbine auto maintain process (auto lubrication), or if a service technician has worked on the turbine. Thus, the turbine can be reinitialized at an interval of one or two weeks.

The invention claimed is:

1. A method of damping tower oscillation in a wind turbine, comprising:
   determining a rotor rotational speed of the wind turbine;
   selecting an input comprising an avoid frequency input parameter, the avoid frequency input parameter being a null value or a critical frequency value; and
   selecting, according to the input parameter value, an operation mode adapted to control the rotor rotational speed of the wind turbine,
   when the avoid frequency input parameter is the null value:
      the selecting of the operation mode is of an auto tuner operation mode,
      detecting a tower oscillation frequency,
      calculating a critical rotor speed based on the detected tower oscillation frequency to avoid the calculated critical rotor speed corresponding to the critical frequency value comprised in the avoid frequency input parameter, and
      controlling the rotor rotational speed to avoid the calculated critical rotor speed; and
   when the avoid frequency input parameter is not null value:
      the selecting of the operation mode is of an static frequency mode, and
      controlling the rotor speed to avoid the avoid frequency input parameter.

2. The method according to claim 1, wherein the selecting the auto tune operation as the operation mode comprises verifying that the detected tower oscillation frequency matches a stored reference frequency.

3. The method according to claim 1, a disable operation mode, which is an operation mode for disabling the tower damping, is selected when the avoid range input parameter is a Null value or a value smaller than a Null value.

4. The method according to claim 1, wherein the critical rotor speed is calculated based on the triple of the detected tower oscillation frequency on the condition of the detected tower oscillation frequency being larger than and/or equal to a rotor speed corresponding to the maximum number or revolutions per minute of the generator of the wind turbine.

5. The method according to claim 1, wherein the controlling the rotor rotational speed comprises:
   increasing a power reference by an additional amount to exceed an optimum power curve of the wind turbine when the rotor speed is below the calculated critical rotor speed and within an outer range encompassing a range specified by the avoid range input parameter;
   decreasing the power reference when the rotor speed is within the range specified by the avoid range input parameter; and
   increasing the power reference up to an optimum power reference of the optimum power curve when the rotor speed exceeds the range specified by the avoid range input parameter.

6. The method according to claim 1, wherein the controlling the rotor rotational speed comprises:
   decreasing a power reference by an additional amount to go below an optimum power curve of the wind turbine when the rotor speed is above the calculated critical rotor speed and within an outer range encompassing a range specified by the avoid range input parameter;
   increasing the power reference when the rotor speed is within the range specified by the avoid range input parameter; and
   decreasing the power reference down to an optimum power reference of the optimum power curve when the rotor speed goes below the range specified by the avoid range input parameter.

7. A wind turbine control apparatus, comprising:
   a speed detector that determines a rotational speed of a rotor of a wind turbine;
   an acceleration sensor that determines a tower oscillation frequency of a tower of the wind turbine;
   a memory that comprises an input parameter value;
   a processing unit:
      controls the rotor rotational speed such that a critical rotor speed is avoided selects an auto tune operation mode when the input parameter is null and selects a static operation mode when the input parameter is not null, when the selected operation mode is the auto tune operation mode the processing unit:

detects the tower oscillation frequency, and calculates the critical rotor speed based on the detected tower oscillation frequency and controlling the rotor rotational speed to avoid the calculated critical rotor speed, when the selected operation mode is the static operation mode the processing unit;

does not detect the tower oscillation frequency, and sets the critical rotor speed based on the input parameter.

8. The wind turbine control apparatus according to claim 7, wherein the auto tune operation mode is selected as the operation mode when the input parameter value comprises an avoid range input parameter with a positive value and when the input parameter value comprises a. avoid frequency parameter with a value of 0.

9. The wind turbine control apparatus according to claim 7, wherein in order to control the rotor rotational speed, the processing unit:

increases a power reference by an additional amount to exceed an optimum power curve of the wind turbine when the rotor speed is below the calculated critical rotor speed and within an outer range encompassing a range specified by the avoid range input parameter, decreases the power reference when the rotor speed is within the range specified by the avoid range input parameter, and increases the power reference up to an optimum power reference of the optimum power curve when the rotor speed exceeds the range specified by the avoid range input parameter.

10. The wind turbine control apparatus according to claim 7, wherein in order to control the rotor rotational speed, the processing unit:

decreases a power reference by an additional amount to go below an optimum power curve of the wind turbine when the rotor speed is above the calculated critical rotor speed and within an outer range encompassing a range specified by the avoid range input parameter;

increases the power reference when the rotor speed is within the range specified by the avoid range input parameter; and decreases the power reference down to an optimum power reference of the optimum power curve when the rotor speed goes below the range specified by the avoid range input parameter.

11. A computer program product stored on a computer-readable medium comprising computer-readable instructions for carrying out the method of claim 1.

* * * * *